US009065969B2

(12) United States Patent
Johnston et al.

(10) Patent No.: US 9,065,969 B2
(45) Date of Patent: Jun. 23, 2015

(54) SCALABLE WEB REAL-TIME COMMUNICATIONS (WEBRTC) MEDIA ENGINES, AND RELATED METHODS, SYSTEMS, AND COMPUTER-READABLE MEDIA

(71) Applicant: Avaya Inc., Basking Ridge, NJ (US)

(72) Inventors: Alan B. Johnston, St. Louis, MO (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 69 days.

(21) Appl. No.: 13/931,968

(22) Filed: Jun. 30, 2013

(65) Prior Publication Data

US 2015/0002619 A1    Jan. 1, 2015

(51) Int. Cl.
*H04N 7/14*      (2006.01)
*H04L 29/06*    (2006.01)

(52) U.S. Cl.
CPC .............. *H04N 7/147* (2013.01); *H04L 65/403* (2013.01)

(58) Field of Classification Search
CPC ........... H04N 21/4788; H04M 3/5175; H04M 3/5183; H04M 3/5191; H04M 3/523
USPC .................. 370/352, 328; 379/93.01, 121.01, 379/265.09; 709/228, 202, 206, 219, 226; 715/744; 726/4; 348/14.12; 360/55; 713/171
See application file for complete search history.

(56) References Cited

U.S. PATENT DOCUMENTS

| 6,714,967 B1 | 3/2004 | Horvitz |
| 7,107,316 B2 | 9/2006 | Brown et al. |
| 7,145,898 B1 | 12/2006 | Elliott |
| 7,266,591 B1 * | 9/2007 | Johnston ............ 709/219 |
| 7,379,993 B2 | 5/2008 | Valdes et al. |
| 7,636,348 B2 * | 12/2009 | Bettis et al. ........... 370/352 |

(Continued)

FOREIGN PATENT DOCUMENTS

| EP | 1615386 A1 | 1/2006 |
| GB | 2468758 A | 9/2010 |

(Continued)

OTHER PUBLICATIONS

Johnston, Alan et al., "Taking on WebRTC in an Enterprise," IEEE Communications Magazine, Apr. 2013, pp. 48-54, vol. 51, Issue 4.

(Continued)

*Primary Examiner* — Gerald Gauthier
(74) *Attorney, Agent, or Firm* — Withrow & Terranova, PLLC

(57) ABSTRACT

Scalable Web Real-Time Communication (WebRTC) media engines, and related methods, systems, and computer-readable media, are disclosed herein. In one embodiment, a method for providing a scalable WebRTC media engine comprises instantiating one or more virtual WebRTC agents, each corresponding to one or more of a plurality of WebRTC clients. The method further comprises establishing a plurality of WebRTC interactive flows, each connecting one of the one or more virtual WebRTC agents with the corresponding one or more of the plurality of WebRTC clients. The method also comprises receiving contents of the plurality of WebRTC interactive flows as input from the one or more virtual WebRTC agents, and synthesizing the contents of the plurality of WebRTC interactive flows. The method additionally comprises directing the synthesized contents as output to one of the more of the plurality of WebRTC interactive flows via the corresponding one or more virtual WebRTC agents.

20 Claims, 8 Drawing Sheets

(56) References Cited

U.S. PATENT DOCUMENTS

| | | | |
|---|---|---|---|
| 7,730,309 B2 | 6/2010 | Zimmermann | |
| 8,015,484 B2 | 9/2011 | Backer | |
| 8,300,632 B2* | 10/2012 | Davis et al. | 370/352 |
| 8,467,308 B2* | 6/2013 | Johnston | 370/252 |
| 8,605,711 B1* | 12/2013 | Sinnreich et al. | 370/352 |
| 8,606,950 B2 | 12/2013 | Glatron et al. | |
| 8,693,392 B2* | 4/2014 | Cooper et al. | 370/328 |
| 8,695,077 B1 | 4/2014 | Gerhard et al. | |
| 8,737,596 B2* | 5/2014 | Kelley et al. | 379/265.09 |
| 8,832,271 B2 | 9/2014 | McCarty | |
| 8,856,236 B2 | 10/2014 | Moore et al. | |
| 8,861,692 B1* | 10/2014 | Phelps et al. | 379/121.01 |
| 8,867,731 B2* | 10/2014 | Lum et al. | 379/265.09 |
| 2003/0112766 A1 | 6/2003 | Riedel et al. | |
| 2003/0131245 A1 | 7/2003 | Linderman | |
| 2005/0084082 A1 | 4/2005 | Horvitz et al. | |
| 2005/0177380 A1* | 8/2005 | Pritchard et al. | 705/1 |
| 2006/0155814 A1 | 7/2006 | Bennett et al. | |
| 2006/0159063 A1* | 7/2006 | Kumar | 370/352 |
| 2007/0083929 A1 | 4/2007 | Sprosts et al. | |
| 2007/0143408 A1 | 6/2007 | Daigle | |
| 2007/0255662 A1 | 11/2007 | Tumminaro | |
| 2007/0283423 A1 | 12/2007 | Bradley et al. | |
| 2008/0162642 A1 | 7/2008 | Bachiri et al. | |
| 2008/0192646 A1 | 8/2008 | Song et al. | |
| 2011/0102930 A1* | 5/2011 | Johnston et al. | 360/55 |
| 2011/0238862 A1 | 9/2011 | Chaturvedi et al. | |
| 2012/0001932 A1 | 1/2012 | Burnett et al. | |
| 2012/0079031 A1* | 3/2012 | Matthews et al. | 709/206 |
| 2012/0158862 A1 | 6/2012 | Mosko et al. | |
| 2013/0091286 A1* | 4/2013 | Spencer | 709/226 |
| 2014/0013202 A1 | 1/2014 | Schlumberger | |
| 2014/0043994 A1 | 2/2014 | Bansal et al. | |
| 2014/0095633 A1 | 4/2014 | Yoakum | |
| 2014/0095724 A1* | 4/2014 | Yoakum et al. | 709/228 |
| 2014/0108594 A1 | 4/2014 | Siegel et al. | |
| 2014/0126708 A1* | 5/2014 | Sayko | 379/93.01 |
| 2014/0126714 A1* | 5/2014 | Sayko | 379/265.09 |
| 2014/0161237 A1 | 6/2014 | Tolksdorf | |
| 2014/0201820 A1* | 7/2014 | Li et al. | 726/4 |
| 2014/0223452 A1 | 8/2014 | Santhanam et al. | |
| 2014/0237057 A1 | 8/2014 | Khodorenko | |
| 2014/0245143 A1 | 8/2014 | Saint-Marc | |
| 2014/0258822 A1 | 9/2014 | Li et al. | |
| 2014/0270104 A1 | 9/2014 | O'Connor | |
| 2014/0280734 A1 | 9/2014 | Chaturvedi et al. | |
| 2014/0282054 A1* | 9/2014 | Yoakum | 715/744 |
| 2014/0282135 A1 | 9/2014 | Segre | |
| 2014/0282399 A1 | 9/2014 | Gorelik et al. | |
| 2014/0282903 A1* | 9/2014 | Singh et al. | 726/4 |
| 2014/0344169 A1 | 11/2014 | Phelps et al. | |
| 2014/0348044 A1 | 11/2014 | Narayanan et al. | |
| 2014/0365676 A1 | 12/2014 | Yoakum | |
| 2014/0379931 A1 | 12/2014 | Gaviria | |
| 2015/0002619 A1* | 1/2015 | Johnston et al. | 348/14.12 |
| 2015/0006610 A1* | 1/2015 | Johnston et al. | 709/202 |
| 2015/0006611 A1* | 1/2015 | Johnston et al. | 709/202 |
| 2015/0026473 A1* | 1/2015 | Johnston et al. | 713/171 |
| 2015/0036690 A1 | 2/2015 | Pastro | |
| 2015/0039687 A1 | 2/2015 | Waxman et al. | |
| 2015/0039760 A1 | 2/2015 | Yoakum | |

FOREIGN PATENT DOCUMENTS

| | | |
|---|---|---|
| GB | 2468759 A | 9/2010 |
| WO | 2014060008 A1 | 4/2014 |
| WO | 2014123738 A1 | 8/2014 |
| WO | 2014190094 A1 | 11/2014 |

OTHER PUBLICATIONS

Search Report for British patent application GB1317121.0 mailed Mar. 14, 2014, 3 pages.
Search Report for British patent application GB1317122.8 mailed Mar. 11, 2014, 3 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Berners-Lee, Tim, "Socially Aware Cloud Storage," Notes on web design, Aug. 17, 2009, http://www.w3.org/DesignIssues/CloudStorage.html, 9 pages.
Chandra, Ramesh et al., "Separating Web Applications from User Data Storage with BStore," presented at the USENIX Conference on Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Josh!, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, mailed Sep. 12, 2014, 15 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 mailed Dec. 30, 2014, 4 pages.
Search Report for British patent application GB1411580.2 mailed Dec. 30, 2014, 4 pages.
Non-Final Office Action for U.S. Appl. No. 13/835,913, mailed Nov. 20, 2014, 15 pages.
Non-Final Office Action for U.S. Appl. No. 13/803,292, mailed Jan. 27, 2015, 13 pages.
Non-Final Office Action for U.S. Appl. No. 14/050,891, mailed Jan. 29, 2015, 9 pages.

(56) References Cited

OTHER PUBLICATIONS

Non-Final Office Action for U.S. Appl. No. 13/955,023, mailed Feb. 2, 2015, 12 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, pp. 1-26.
Jesup, R. et al., "DTLS Encapsulationof SCTP Packets for RTCWEB," IETF: Network Working Group, Internet Draft, Feb. 16, 2013, pp. 1-6.
Rescorla, E., "Security Considerations for RTC-Web," IETF RTCWEB, Internet Draft, Jan. 22, 2013, pp. 1-16.
Rescorla, E., "WebRTC Security Architecture," IETF RTCWEB, Internet Draft, Jul. 14, 2013, pp. 1-30.
Notice of Allowance for U.S. Appl. No. 13/944,368, mailed Apr. 1, 2015, 8 pages.
Non-Final Office Action for U.S. Appl. No. 13/931,967, mailed May 5, 2015, 10 pages.
Non-Final Office Action fo U.S. Appl. No. 13/931,970, mailed May 7, 2015, 9 pages.

\* cited by examiner

SCALABLE WEB REAL-TIME COMMUNICATIONS (WEBRTC) MEDIA ENGINES, AND RELATED METHODS, SYSTEMS, AND COMPUTER-READABLE MEDIA

BACKGROUND

1. Field of the Disclosure

The technology of the disclosure relates generally to Web Real-Time Communications (WebRTC) interactive sessions.

2. Technical Background

Web Real-Time Communications (WebRTC) represents an ongoing effort to develop industry standards for integrating real-time communications functionality into web clients, such as web browsers, to enable direct interaction with other web clients. This real-time communications functionality is accessible by web developers via standard markup tags, such as those provided by version 5, of the Hypertext Markup Language (HTML5), and client-side scripting Application Programming Interfaces (APIs), such as JavaScript APIs. More information regarding WebRTC may be found in "WebRTC: APIs and RTCWEB Protocols of the HTML5, Real-Time Web," by Alan B. Johnston and Daniel C. Burnett (2012, Digital Codex LLC), which is incorporated herein in its entirety by reference.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www/ietf.org.

To establish a WebRTC interactive session (e.g., a real-time video, audio, and/or data exchange), two web clients may retrieve WebRTC-enabled web applications, such as HTML5/JavaScript web applications, from a WebRTC application server. Through the web applications, the two web clients engage in a media negotiation to communicate and reach an agreement on parameters that define characteristics of the WebRTC interactive session. This media negotiation is known as a WebRTC "offer/answer" exchange. Once the WebRTC offer/answer exchange is complete, the web clients may then establish a direct peer connection with one another, and may begin a real-time exchange of media or data. The peer connection between the web clients typically employs the Secure Real-time Transport Protocol (SRTP) to transport real-time media flows, and may utilize various other protocols for real-time data interchange.

In multi-party WebRTC interactive sessions, each participating web client may be directly connected to every other participating web client in what is referred to as a "full mesh" or "fully distributed" architecture. However, the "full mesh" architecture may impose significant burdens on computing resources and bandwidth utilization. Multi-party WebRTC interactive sessions may also be handled by a central media server to which every web client is connected. Implementing such a central media server may pose challenges due to new media extensions employed by WebRTC, as well as variations between implementations of a WebRTC media stack in different web client types and client versions.

SUMMARY OF THE DETAILED DESCRIPTION

Embodiments disclosed in the detailed description provide scalable Web Real-Time Communications (WebRTC) media engines. Related methods, systems, and computer-readable media are also disclosed. In some embodiments, a WebRTC server, through which two or more WebRTC clients seek to establish a WebRTC interactive session, provides a scalable WebRTC media engine. The WebRTC media engine instantiates one or more virtual WebRTC agents, and causes each of the two or more WebRTC clients to establish a WebRTC interactive flow with the one or more virtual WebRTC agents. The WebRTC media engine then synthesizes audio and/or video content from the established WebRTC interactive flows, and provides the resulting synthesized content to the WebRTC interactive flows via the one or more virtual WebRTC agents. In this manner, the WebRTC media engine may provide synthesizing of WebRTC interactive flow content in a scalable fashion without requiring a full mesh architecture, and without placing an excess burden on local computing resources.

In this regard, in one embodiment, a method for providing a scalable WebRTC media engine is provided. The method comprises instantiating, by a WebRTC media engine executing on a computing device, one or more virtual WebRTC agents, each corresponding to one or more of a plurality of WebRTC clients. The method further comprises establishing a plurality of WebRTC interactive flows, each connecting one of the one or more virtual WebRTC agents with the corresponding one or more of the plurality of WebRTC clients. The method also comprises receiving contents of the plurality of WebRTC interactive flows as input from the one or more virtual WebRTC agents. The method additionally comprises synthesizing the contents of the plurality of WebRTC interactive flows. The method further comprises directing the synthesized contents as output to one or more of the plurality of WebRTC interactive flows via the one or more virtual WebRTC agents.

In another embodiment, a system for providing a scalable WebRTC media engine is provided. The system comprises at least one communications interface, and a WebRTC server associated with the at least one communications interface. The WebRTC server comprises a WebRTC media engine configured to instantiate one or more virtual WebRTC agents, each corresponding to one or more of a plurality of WebRTC clients. The WebRTC media engine is further configured to establish a plurality of WebRTC interactive flows, each connecting one of the one or more virtual WebRTC agents with the corresponding one or more of the plurality of WebRTC clients. The WebRTC media engine is also configured to receive contents of the plurality of WebRTC interactive flows as input from the one or more virtual WebRTC agents. The WebRTC media engine is additionally configured to synthesize the contents of the plurality of WebRTC interactive flows. The WebRTC media engine is further configured to direct the synthesized contents as output to one or more of the plurality of WebRTC interactive flows via the one or more virtual WebRTC agents.

In another embodiment, a non-transitory computer-readable medium is provided. The non-transitory computer-readable medium has stored thereon computer-executable instructions to cause a processor to implement a method comprising instantiating one or more virtual WebRTC agents, each corresponding to one or more of a plurality of WebRTC clients. The method implemented by the computer-executable instructions further comprises establishing a plurality of WebRTC interactive flows, each connecting one of the one or more virtual WebRTC agents with the corresponding one or more of the plurality of WebRTC clients. The method implemented by the computer-executable instructions also comprises receiving contents of the plurality of WebRTC interactive flows as input from the one or more virtual WebRTC agents. The method implemented by the computer-executable instructions additionally comprises synthesizing the contents of the plurality of WebRTC interactive flows. The method implemented by the computer-executable instructions further comprises directing the synthesized contents as output to one or more of the plurality of WebRTC interactive flows via the one or more virtual WebRTC agents.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
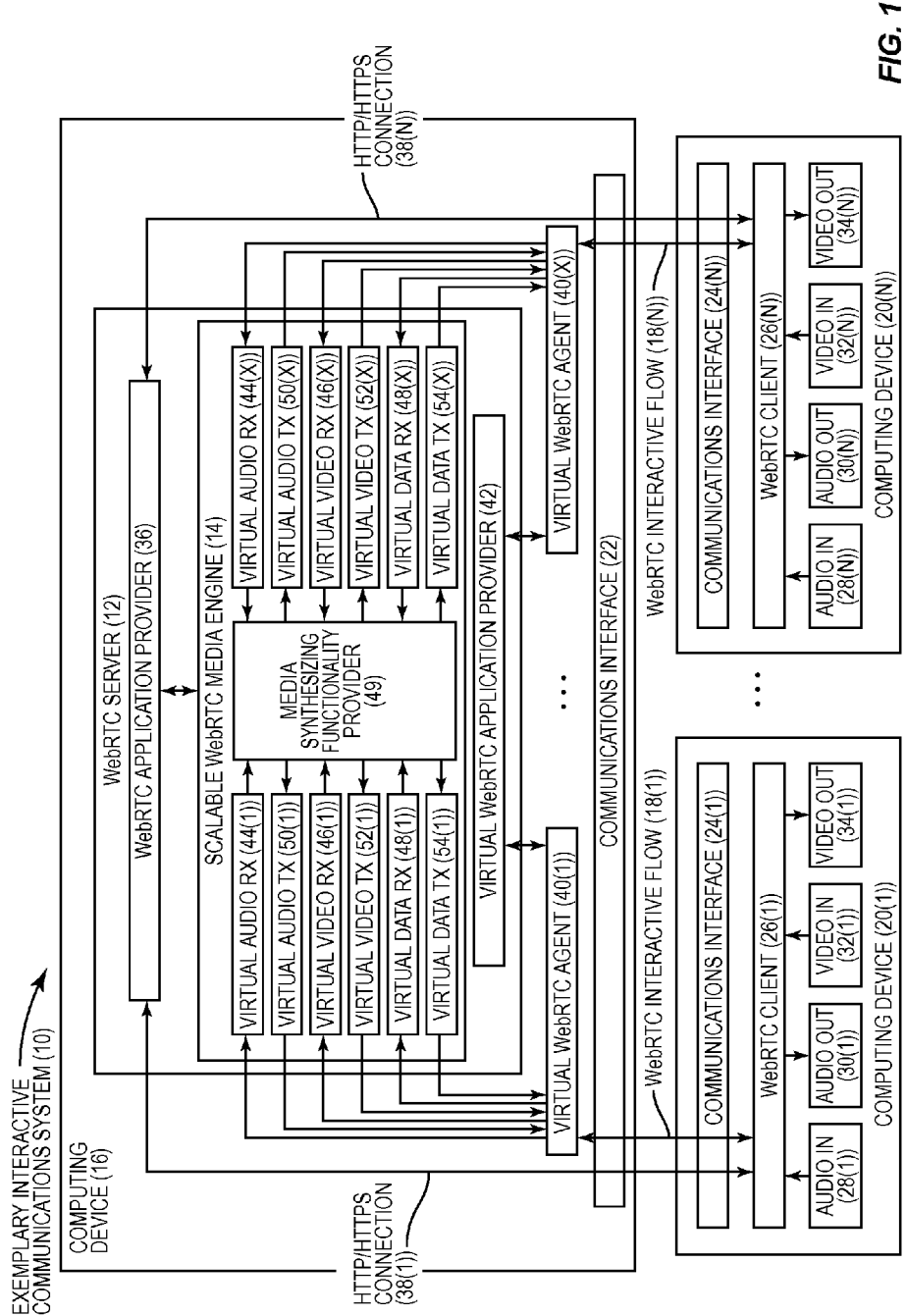
FIG. 1 is a conceptual diagram illustrating a Web Real-Time Communications (WebRTC) interactive session between multiple WebRTC clients via a WebRTC server including a scalable WebRTC media engine and virtual WebRTC agents.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide scalable Web Real-Time Communications (WebRTC) media engines. Related methods, systems, and computer-readable media are also disclosed. In some embodiments, a WebRTC server, through which two or more WebRTC clients seek to establish a WebRTC interactive session, provides a scalable WebRTC media engine. The WebRTC media engine instantiates one or more virtual WebRTC agents, and causes each of the two or more WebRTC clients to establish a WebRTC interactive flow with the one or more virtual WebRTC agents. The WebRTC media engine then synthesizes audio, video, and/or data content from the established WebRTC interactive flows, and provides the resulting synthesized content to the WebRTC interactive flows via the one or more virtual WebRTC agents. In this manner, the WebRTC media engine may provide synthesizing of WebRTC interactive flow content in a scalable fashion without requiring a full mesh architecture, and without placing an excess burden on local computing resources.

In this regard, in one embodiment, a method for providing a scalable WebRTC media engine is provided. The method comprises instantiating, by a WebRTC media engine executing on a computing device, one or more virtual WebRTC agents, each corresponding to one or more of a plurality of WebRTC clients. The method further comprises establishing a plurality of WebRTC interactive flows, each connecting one of the one or more virtual WebRTC agents with the corresponding one or more of the plurality of WebRTC clients. The method also comprises receiving contents of the plurality of WebRTC interactive flows as input from the one or more virtual WebRTC agents. The method additionally comprises synthesizing the contents of the plurality of WebRTC interactive flows. The method further comprises directing the synthesized contents as output to one or more of the plurality of WebRTC interactive flows via the one or more virtual WebRTC agents.

FIG. 1 illustrates an exemplary interactive communications system 10 providing a scalable WebRTC media engine as disclosed herein. In particular, the exemplary interactive communications system 10 provides a WebRTC server 12, including a scalable WebRTC media engine 14, that executes on a computing device 16. The scalable WebRTC media engine 14 handles instantiation of virtual WebRTC agents, and coordinates synthesizing of audio, video, and/or data content of WebRTC interactive flows provided by the virtual WebRTC agents. As used herein, a "virtual WebRTC agent" refers to an instance of a browser or other WebRTC-enabled client application that executes on the computing device 16 under the control of the scalable WebRTC media engine 14. A "WebRTC interactive session" refers to operations for carrying out a WebRTC offer/answer exchange, establishing a peer connection, and commencing a WebRTC interactive flow between two or more endpoints. A "WebRTC interactive flow," as disclosed herein, refers to an interactive media flow and/or an interactive data flow that passes between or among two or more endpoints according to WebRTC standards and protocols. As non-limiting examples, an interactive media flow constituting a WebRTC interactive flow may comprise a real-time audio stream and/or a real-time video stream, or other real-time media or data streams. Data and/or media comprising a WebRTC interactive flow may be collectively referred to herein as "content."

In FIG. 1, a plurality of WebRTC interactive flows 18(1)-18(N) pass between the computing device 16 and a corresponding plurality of computing devices 20(1)-20(N). It is to be understood that the computing devices 16 and 20(1)-20(N) may all be located within the same public or private network, or may be located within separate, communicatively coupled public or private networks. Some embodiments of the interactive communications system 10 of FIG. 1 may provide that each of the computing devices 16 and 20(1)-20(N) may be any computing device having network communications capabilities, such as a smartphone, a tablet computer, a dedicated web appliance, a media server, a desktop or server computer, or a purpose-built communications device, as non-limiting examples. The computing devices 16 and 20(1)-20(N) include communications interfaces 22 and 24(1)-24(N), respectively, for connecting the computing devices 16 and 20(1)-20(N) to one or more public and/or private networks. In some embodiments, the elements of the computing devices 16 and 20(1)-20(N) may be distributed across more than one computing device 16 and 20(1)-20(N). While FIG. 1 shows two computing devices 20(1) and 20(N) for the sake of illustration (i.e., N=2), it is to be understood that the number of computing devices 20 in embodiments of the exemplary interactive communications system 10 may be greater than two.

The computing devices 20(1)-20(N) of FIG. 1 include WebRTC clients 26(1)-26(N), respectively. Each of the WebRTC clients 26(1)-26(N) may be a WebRTC-enabled web browser application, a dedicated communications application, a mobile application, or an interface-less application, such as a daemon or service application, as non-limiting examples. The WebRTC clients 26(1)-26(N) implement the protocols, codecs, and Application Programming Interfaces (APIs) necessary to provide real-time WebRTC interactive sessions between the computing devices 20(1)-20(N), respectively, and the computing device 16.

As seen in FIG. 1, the computing devices 20(1)-20(N) are communicatively coupled to respective audio in devices 28(1)-28(N) (e.g., microphones) for receiving audio input, and audio out devices 30(1)-30(N) (for example, speakers or headphones) for generating audio output. The computing devices 20(1)-20(N) are further communicatively coupled to respective video in devices 32(1)-32(N) (such as cameras, webcams, or other video sources) for receiving video input, and video out devices 34(1)-34(N) (e.g., displays) for displaying video output. The audio in devices 28(1)-28(N), the audio out devices 30(1)-30(N), the video in devices 32(1)-32(N), and/or the video out devices 34(1)-34(N) may be integrated into the respective computing devices 20(1)-20(N), and/or they may be peripheral devices and/or virtual devices communicatively coupled to the respective computing devices 20(1)-20(N). In some embodiments, the computing devices 20(1)-20(N) may be communicatively coupled to more or fewer devices than illustrated in FIG. 1.

To establish a WebRTC interactive session, each of the WebRTC clients 26(1)-26(N) downloads a WebRTC web application (not shown) from a WebRTC application provider 36 of the WebRTC server 12 via corresponding Hyper Text Transfer Protocol (HTTP)/Hyper Text Transfer Protocol Secure (HTTPS) connections 38(1)-38(N). In some embodiments, the WebRTC web application may comprise an HTML5/JavaScript web application that provides a rich user interface using HTML5, and uses JavaScript to handle user input and to communicate with the WebRTC application provider 36. The WebRTC clients 26(1)-26(N) then engage in a WebRTC offer/answer exchange by exchanging WebRTC session description objects (not shown) via the WebRTC application provider 36. The exchanged WebRTC session description objects are used to determine the media types and capabilities for the desired WebRTC interactive session.

Typically, after the WebRTC offer/answer exchange is complete, WebRTC interactive flows are established directly between the WebRTC clients 26(1)-26(N) via one or more peer connections. For example, in a full mesh architecture, the WebRTC clients 26(1)-26(N) are all connected to each other, with each of the WebRTC clients 26(1)-26(N) receiving and synthesizing the WebRTC interactive flows received from the other WebRTC clients 26. However, this may result in the consumption of significant computing resources and/or network bandwidth, and may provide limited scalability and compatibility between and among the WebRTC clients 26(1)-26(N).

In this regard, virtual WebRTC agents 40(1)-40(X) are provided by the scalable WebRTC media engine 14. In some embodiments, the number X of virtual WebRTC agents 40 may be less than or equal to the number N of WebRTC clients 26 (i.e., $1 \leq X \leq N$). In the example of FIG. 1, as the WebRTC application provider 36 receives the WebRTC offer/answer exchange from the WebRTC clients 26(1)-26(N), the scalable WebRTC media engine 14 instantiates the virtual WebRTC agents 40(1)-40(X) corresponding to the WebRTC clients 26(1)-26(N). In some embodiments, the scalable WebRTC media engine 14 may instantiate the virtual WebRTC agents 40(1)-40(X) by launching one or more instances of a WebRTC client such as a web browser on the computing device 16. Some embodiments may provide that the virtual WebRTC agents 40(1)-40(X) are executed within a virtual instance of an operating system.

After instantiation, the virtual WebRTC agents 40(1)-40(X) are each directed by the scalable WebRTC media engine 14 to download a virtual WebRTC application (not shown) from a virtual WebRTC application provider 42. Some embodiments may provide that the virtual WebRTC application provider 42 is communicatively coupled to the scalable WebRTC media engine 14. In some embodiments, the virtual WebRTC application provider 42 may be integrated into or otherwise constitute an element of the scalable WebRTC media engine 14 and/or the WebRTC application provider 36. The virtual WebRTC application includes specialized instructions for interfacing with the WebRTC APIs of the virtual WebRTC agents 40(1)-40(X). The virtual WebRTC agents 40(1)-40(X) may communicate via the virtual WebRTC application with the WebRTC clients 26(1)-26(N), respectively, and with the scalable WebRTC media engine 14.

The scalable WebRTC media engine 14 causes the virtual WebRTC agents 40(1)-40(X) to establish the WebRTC interactive flows 18(1)-18(N) with the corresponding WebRTC clients 26(1)-26(N). In doing so, the scalable WebRTC media engine 14 and/or the virtual WebRTC agents 40(1)-40(X) may modify the data being passed between the WebRTC clients 26(1)-26(N) to facilitate the establishment of the WebRTC interactive flows 18(1)-18(N). For example, data related to the location and/or identity of the endpoints of each of the WebRTC interactive flows 18(1)-18(N) may be modified to permit the virtual WebRTC agents 40(1)-40(X) to act as proxies for their corresponding WebRTC clients 26(1)-26(N).

Once the WebRTC interactive flows 18(1)-18(N) are established, the scalable WebRTC media engine 14 receives content of the WebRTC interactive flows 18(1)-18(N) as input from the virtual WebRTC agents 40(1)-40(X). In some embodiments, the scalable WebRTC media engine 14 provides virtual audio receivers (Rx) 44(1)-44(X), virtual video receivers 46(1)-46(X), and/or virtual data receivers 48(1)-48(X), to which the corresponding virtual WebRTC agents 40(1)-40(X) are communicatively coupled. As the WebRTC interactive flows 18(1)-18(N) commence, the virtual WebRTC agents 40(1)-40(X) forward audio signals received from the corresponding WebRTC interactive flows 18(1)-18(N) to the virtual audio receivers 44(1)-44(X). The virtual WebRTC agents 40(1)-40(X) also forward video signals received from the corresponding WebRTC interactive flows 18(1)-18(N) to the virtual video receivers 46(1)-46(X), and forward data received from the corresponding WebRTC interactive flows 18(1)-18(N) to the virtual data receivers 48(1)-48(X).

The scalable WebRTC media engine 14 then synthesizes the content of the WebRTC interactive flows 18(1)-18(N) received from the virtual WebRTC agents 40(1)-40(X). Some embodiments may provide that the synthesizing of the content of the WebRTC interactive flows 18(1)-18(N) is carried out by a media synthesizing functionality provider 49 of the scalable WebRTC media engine 14. Synthesizing the content of the WebRTC interactive flows 18(1)-18(N) may include selectively combining audio, video, and/or data content of the WebRTC interactive flows 18(1)-18(N) to generate synthesized content. Synthesizing the content of the WebRTC interactive flows 18(1)-18(N) may also include generating and adding audio, video, and/or data content to the content of the WebRTC interactive flows 18(1)-18(N). For example, the scalable WebRTC media engine 14 may inject content into the WebRTC interactive flows 18(1)-18(N) by adding content to an input from the virtual audio receivers 44(1)-44(X), the virtual video receivers 46(1)-46(X), and/or the virtual data receivers 48(1)-48(X). In some embodiments, synthesizing the content of the WebRTC interactive flows 18(1)-18(N) may include applying an audio processing algorithm. As non-limiting examples, an N loudest algorithm (i.e., including the N loudest participants in the audio content), a loudest and longest algorithm (prioritizing audio sources that are loudest or that have been generating output for the longest amount of time), or an N−1, algorithm (including all audio sources except those associated with a receiving endpoint), or combinations thereof, may be applied to an audio content of the WebRTC interactive flows 18(1)-18(N). Some embodiments may provide that synthesizing the contents of the plurality of WebRTC interactive flows may include selecting a video content of one or more of the plurality of WebRTC interactive flows, combining video contents of two or more of the plurality of WebRTC interactive flows, modifying a video content of one or more of the plurality of WebRTC interactive flows, or combinations thereof. According to some embodiments disclosed herein, custom synthesized content may be generated for specific ones of the virtual WebRTC agents 40(1)-40(X) and/or the WebRTC clients 26(1)-26(N).

The synthesized content is then directed by the scalable WebRTC media engine 14 as output to the WebRTC interactive flows 18(1)-18(N) via the virtual WebRTC agents 40(1)-40(X). In some embodiments, the media synthesizing functionality provider 49 is configured to direct the synthesized content to virtual audio transmitters (Tx) 50(1)-50(X), virtual video transmitters 52(1)-52(X), and/or virtual data transmitters 54(1)-54(X) to which the corresponding virtual WebRTC agents 40(1)-40(X) are communicatively coupled.

In the example of FIG. 1, the virtual WebRTC agents 40(1)-40(X) are instantiated by the scalable WebRTC media engine 14. This arrangement may be useful in circumstances in which the WebRTC clients 26(1)-26(N) are known to be incompatible or to have limited compatibility. As a non-limiting example, the WebRTC clients 26(1)-26(N) may be web browsers having differing levels of support for the WebRTC APIs. To remedy such incompatibilities, the specific client type and/or client version of one or more of the WebRTC clients 26(1)-26(N) may be determined by the WebRTC application provider 36 and/or the scalable WebRTC media engine 14. In some embodiments, the client type and/or client version of one or more of the WebRTC clients 26(1)-26(N) may be determined based on data received as part of a WebRTC offer/answer exchange, a query/response exchange between the scalable WebRTC media engine 14 and the WebRTC clients 26(1)-26(N), an HTTP header, or other data provided by the WebRTC clients 26(1)-26(N). The scalable WebRTC media engine 14 may then instantiate the virtual WebRTC agents 40(1)-40(X) having a client type and/or version corresponding to the client type and/or version of the respective WebRTC clients 26(1)-26(N). As a result, because each of the WebRTC clients 26(1)-26(N) directly communicates with a virtual WebRTC agent 40 of the same type and version, incompatibilities between the WebRTC clients 26(1)-26(N) may be resolved.

Conversely, in situations in which the WebRTC clients 26(1)-26(N) are known to be compatible, the scalable WebRTC media engine 14 may provide a WebRTC interactive session between the WebRTC clients 26(1)-26(N) using a single virtual WebRTC agent. Providing a single virtual WebRTC agent may conserve computing resources of the computing device 16 and further increase the scalability of the WebRTC server 12. This embodiment is discussed in greater detail below with respect to FIG. 4.

Figure 2:
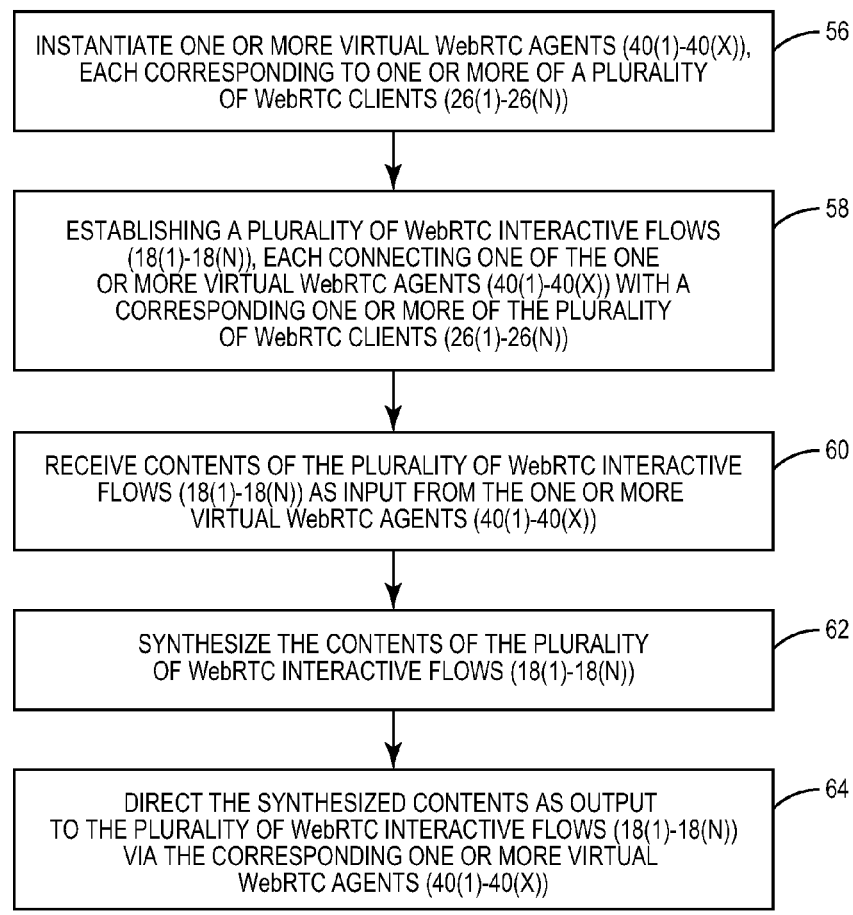
FIG. 2 is a flowchart illustrating exemplary operations of the WebRTC server and the WebRTC media engine of FIG. 1 for providing audio, video, and/or data synthesizing for multi-party WebRTC interactive sessions.

To generally describe exemplary operations of the scalable WebRTC media engine 14 of FIG. 1 for providing the virtual WebRTC agents 40(1)-40(X), FIG. 2 is provided. For the sake of clarity, elements of FIG. 1 are referenced in describing FIG. 2. In the example of FIG. 2, operations begin with the scalable WebRTC media engine 14 instantiating one or more virtual WebRTC agents 40(1)-40(X), each corresponding to one or more of a plurality of WebRTC clients 26(1)-26(N) (block 56). Some embodiments may provide that a single virtual WebRTC agent is instantiated if the plurality of WebRTC clients 26(1)-26(N) is determined to be compatible. In some embodiments, a virtual WebRTC agent 40 may be established for each of the plurality of WebRTC clients 26(1)-26(N) if the plurality of WebRTC clients 26(1)-26(N) is determined to be incompatible. As a non-limiting example, the scalable WebRTC media engine 14 may instantiate the one or more virtual WebRTC agents 40(1)-40(X) by launching one or more instances of a WebRTC client, such as a web browser, on the computing device 16.

The scalable WebRTC media engine 14 then establishes a plurality of WebRTC interactive flows 18(1)-18(N), each connecting one of the one or more virtual WebRTC agents 40(1)-40(X) with a corresponding one or more of the plurality of WebRTC clients 26(1)-26(N) (block 58). According to some embodiments herein, the scalable WebRTC media engine 14 and/or the virtual WebRTC agents 40(1)-40(X) may modify the data being passed between the WebRTC clients 26(1)-26(N) to facilitate the establishment of the WebRTC interactive flows 18(1)-18(N). For example, data relating to the location and/or identity of the endpoints of each of the WebRTC interactive flows 18(1)-18(N) may be modified to permit the virtual WebRTC agents 40(1)-40(X) to act as proxies for their corresponding WebRTC clients 26(1)-26(N).

The scalable WebRTC media engine 14 next receives contents of the plurality of WebRTC interactive flows 18(1)-18(N) as input from the one or more virtual WebRTC agents 40(1)-40(X) (block 60). In some embodiments, this may be accomplished through the use of virtual audio receivers 44, virtual video receivers 46, and virtual data receivers 48 provided by the scalable WebRTC media engine 14, as illustrated in FIG. 1. The WebRTC media engine 14 then synthesizes the contents of the plurality of WebRTC interactive flows 18(1)-18(N) (block 62). Some embodiments may provide that the synthesizing of the contents of the WebRTC interactive flows 18(1)-18(N) is carried out by a media synthesizing functionality provider 49 of the scalable WebRTC media engine 14. Synthesizing the contents of the WebRTC interactive flows 18(1)-18(N) may include selectively combining audio, video, and/or data content of the WebRTC interactive flows 18(1)-18(N) to generated synthesized content.

The scalable WebRTC media engine 14 then directs the synthesized contents as output to the plurality of WebRTC interactive flows 18(1)-18(N) via the one or more virtual WebRTC agents 40(1)-40(X) (block 64). Some embodiments may provide that the scalable WebRTC media engine 14 directs the synthesized content using virtual audio transmitters 50(1)-50(X), virtual video transmitters 52(1)-52(X), and/or virtual data transmitters 54(1)-54(X) to which the corresponding virtual WebRTC agents 40(1)-40(X) are communicatively coupled. Thus, the scalable WebRTC media engine 14 may provide synthesizing of content from the plurality of WebRTC interactive flows 18(1)-18(N) in an efficient and scalable manner, while automatically resolving any potential incompatibility issues between the plurality of WebRTC clients 26(1)-26(N).

Figure 3:
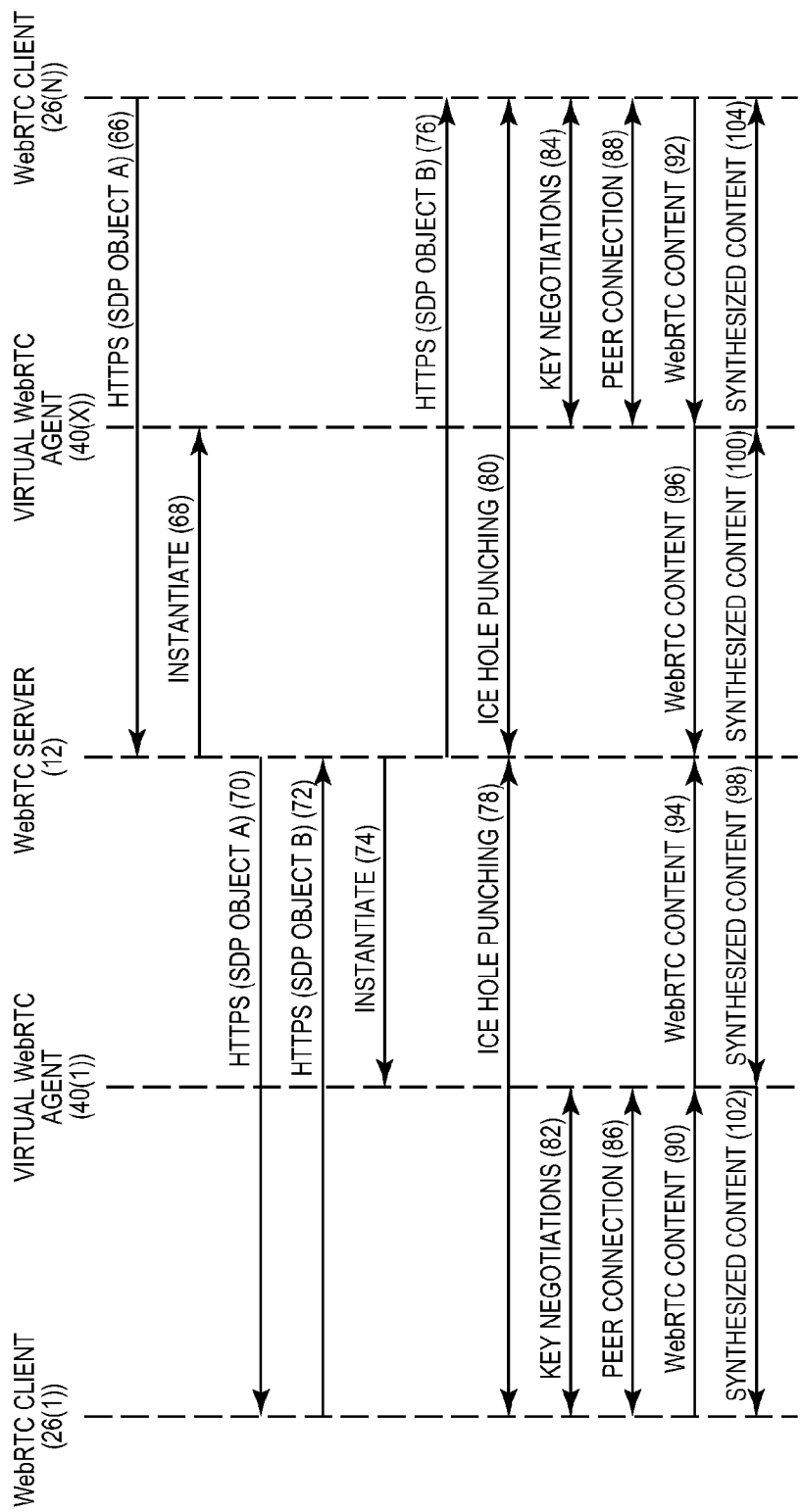
FIG. 3 is a diagram illustrating exemplary communications flows within an exemplary system including the WebRTC media engine and the virtual WebRTC agents of FIG. 1.

To illustrate exemplary communications flows during the establishment of a WebRTC interactive session using the virtual WebRTC agents 40(1)-40(X) of FIG. 1, FIG. 3 is provided. In FIG. 3, the WebRTC client 26(1), the virtual WebRTC agent 40(1), the WebRTC server 12, the virtual WebRTC agent 40(X), and the WebRTC client 26(N) of FIG. 1 are each represented by vertical dotted lines. It is to be understood that the WebRTC server 12 includes the WebRTC application provider 36 and the scalable WebRTC media engine 14, which for the sake of clarity are omitted from this example. It is to be further understood for this example that the WebRTC clients 26(1) and 26(N) have each downloaded a WebRTC-enabled web application, such as an HTML5/JavaScript WebRTC application, from the WebRTC server 12.

As seen in FIG. 3, the establishment of a WebRTC interactive session via the virtual WebRTC agents 40(1) and 40(X) begins with the WebRTC client 26(N) sending a session description object (SDP) to the WebRTC server 12 (in this example, via an HTTPS connection). The WebRTC session description object is referred to as SDP Object A and is indicated by arrow 66. SDP Object A represents the "offer" in a WebRTC offer/answer exchange, and specifies the media types and capabilities that the WebRTC client 26(N) supports and prefers for use in the WebRTC interactive session.

The WebRTC server 12 (i.e., the scalable WebRTC media engine 14) instantiates the virtual WebRTC agent 40(X) corresponding to the WebRTC client 26(N), as indicated by arrow 68. In some embodiments, a client type and/or a client version of the WebRTC client 26(N) may be determined based on the SDP Object A, a query/response exchange between the scalable WebRTC media engine 14 and the WebRTC client 26(N), an HTTP header, or other data provided by the WebRTC client 26(N). The virtual WebRTC agent 40(X) may be instantiated having a client type and/or a client version that is known to be compatible with the WebRTC client 26(N). The WebRTC server 12 then forwards the SDP Object A to the WebRTC client 26(1), as indicated by arrow 70.

After the WebRTC client 26(1) receives the SDP Object A from the WebRTC server 12, the WebRTC client 26(1) in response sends a WebRTC session description object, referred to as SDP Object B, via HTTPS to the WebRTC server 12, as indicated by arrow 72. The SDP Object B in this example represents the "answer" in the WebRTC offer/answer exchange. The WebRTC server 12 then instantiates the virtual WebRTC agent 40(1) corresponding to the WebRTC client 26(1), as indicated by arrow 74. Some embodiments may provide that a client type and/or a client version of the WebRTC client 26(1) may be determined based on the SDP Object B, a query/response exchange between the scalable WebRTC media engine 14 and the WebRTC client 26(1), an HTTP header, or other data provided by the WebRTC client 26(1). The virtual WebRTC agent 40(1) may be instantiated having a client type and/or a client version known to be compatible with the WebRTC client 26(1). The WebRTC server 12, in turn, forwards the SDP Object B to the WebRTC client 26(N), as shown by arrow 76.

With continuing reference to FIG. 3, the WebRTC clients 26(1) and 26(N) then begin "hole punching" to determine the best way to establish direct communications with the virtual WebRTC agents 40(1) and 40(X), respectively. This is indicated by bidirectional arrows 78 and 80 in FIG. 3. Hole punching is a technique, often using protocols such as Interactive Connectivity Establishment (ICE), in which both of the WebRTC clients 26(1) and 26(N) establish a connection with an unrestricted third-party server (not shown) that uncovers external and internal address information for use in direct communications.

Once the ICE hole punching indicated by arrows 78 and 80 is successful, the WebRTC clients 26(1) and 26(N) begin key negotiations to establish a secure peer connection. In a typical peer-to-peer architecture, the key negotiations take place directly between the WebRTC clients 26(1) and 26(N). However, in this example, each of the WebRTC clients 26(1) and 26(N) negotiates with its corresponding virtual WebRTC agent 40(1) and 40(X), as indicated by bidirectional arrows 82 and 84. If key negotiations are successfully concluded, peer connections are established between the WebRTC client 26(1) and the virtual WebRTC agent 40(1), and between the WebRTC client 26(N) and the virtual WebRTC agent 40(X), as indicated by bidirectional arrows 86 and 88.

Upon establishing peer connections with their corresponding virtual WebRTC agents 40(1) and 40(X), the WebRTC clients 26(1) and 26(N) begin exchanging WebRTC media and/or data flows. As seen in FIG. 3, the WebRTC media and/or data flows pass from the WebRTC clients 26(1) and 26(N) to their respective virtual WebRTC agents 40(1) and 40(X), as indicated by bidirectional arrows 90 and 92. The virtual WebRTC agents 40(1) and 40(X) then send the content of the WebRTC interactive flows 18(1) and 18(N) to the WebRTC server 12, as shown by bidirectional arrows 94 and 96. The WebRTC server 12 synthesizes the contents of the WebRTC interactive flows 18(1) and 18(N), and directs the synthesized contents to the virtual WebRTC agents 40(1) and 40(X), as indicated by bidirectional arrows 98 and 100. The virtual WebRTC agents 40(1) and 40(X) then forward the synthesized contents to the corresponding WebRTC clients 26(1) and 26(N), as shown by arrows 102 and 104. In this manner, the WebRTC server 12 may selectively synthesize the contents of the WebRTC interactive flows 18(1)-18(N) and provide the synthesized contents to the WebRTC clients 26(1) and 26(N).

Figure 4:
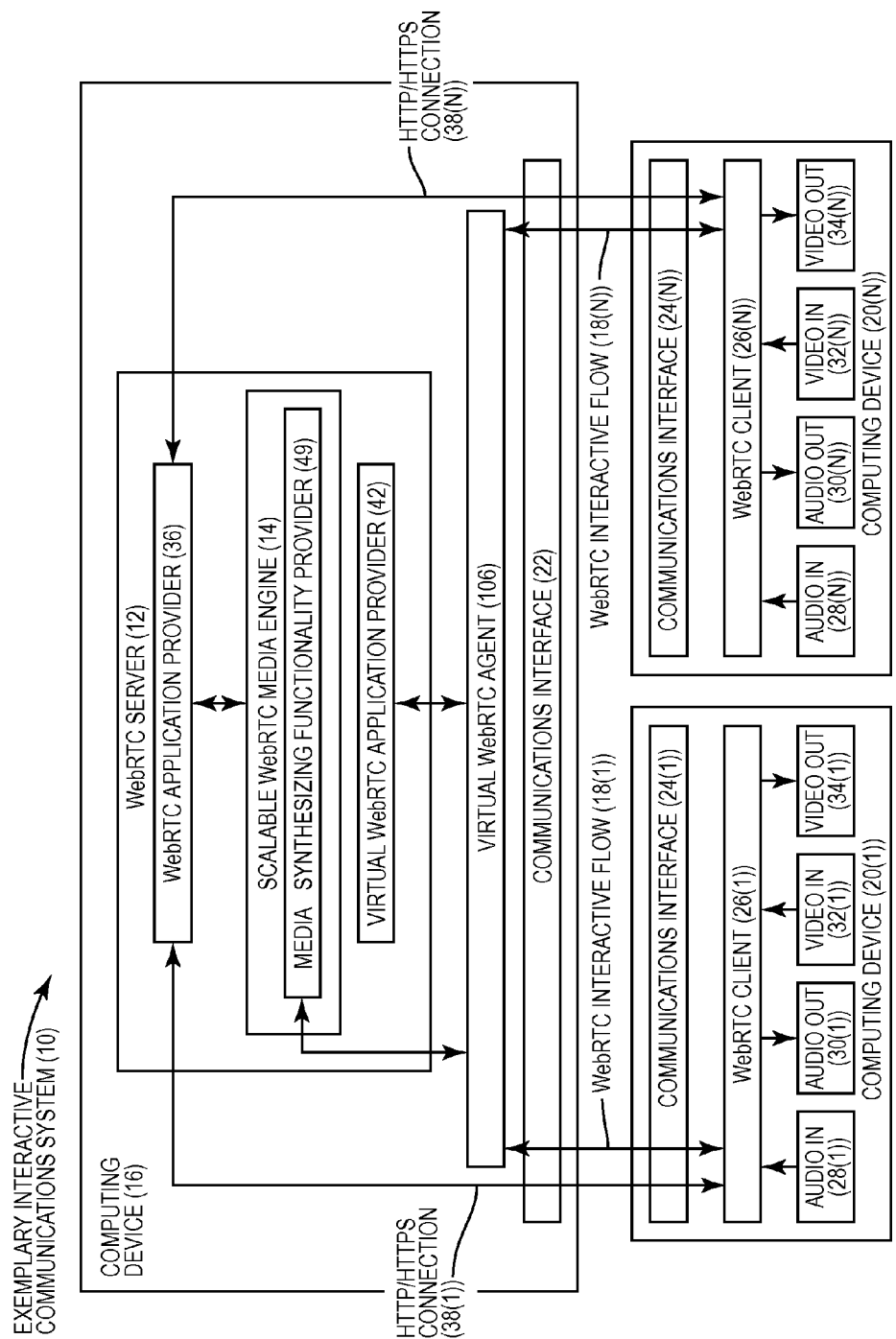
FIG. 4 is a conceptual diagram illustrating a WebRTC interactive session between multiple WebRTC clients utilizing a single virtual WebRTC agent managed by a WebRTC media engine.

As noted above with respect to FIG. 1, the scalable WebRTC media engine 14 may enable a WebRTC interactive session between the WebRTC clients 26(1)-26(N) using a single virtual WebRTC agent if the WebRTC clients 26(1)-26(N) are known to be compatible. To illustrate this embodiment, FIG. 4 is provided. In FIG. 4, the exemplary interactive communications system 10 of FIG. 1 is shown. In this example, however, it is assumed that the WebRTC clients 26(1)-26(N) are known to be compatible. For instance, the WebRTC clients 26(1)-26(N) may be WebRTC-enabled web browsers of the same type and version. Thus, in the embodiment of FIG. 4, the scalable WebRTC media engine 14 instantiates a single virtual WebRTC agent 106 to which the WebRTC clients 26(1)-26(N) may connect. The virtual WebRTC agent 106 downloads a virtual WebRTC application (not shown) from the virtual WebRTC application provider 42 at the direction of the scalable WebRTC media engine 14. The virtual WebRTC application may contain specialized instructions for enabling the virtual WebRTC agent 106 to communicate with the WebRTC clients 26(1)-26(N) and with the scalable WebRTC media engine 14. In some embodiments, the virtual WebRTC application may enable the scalable WebRTC media engine 14 to control how the virtual WebRTC agent 106 directs audio, video, and/or data content to the WebRTC clients 26(1)-26(N).

In the example of FIG. 4, the scalable WebRTC media engine 14 causes the virtual WebRTC agent 106 to establish the WebRTC interactive flows 18(1)-18(N) with the WebRTC clients 26(1)-26(N). The virtual WebRTC agent 106 may then employ its built-in WebRTC APIs to direct contents of the WebRTC interactive flows 18(1)-18(N) to the media synthesizing functionality provider 49 of the scalable WebRTC media engine 14 for synthesizing. In some embodiments, the virtual WebRTC agent 106 may provide media synthesizing functionality itself using the WebRTC APIs. After synthesizing, the virtual WebRTC agent 106 may direct a resulting synthesized content from the scalable WebRTC media engine 14 into the WebRTC interactive flows 18(1)-18(N).

Figure 5A:
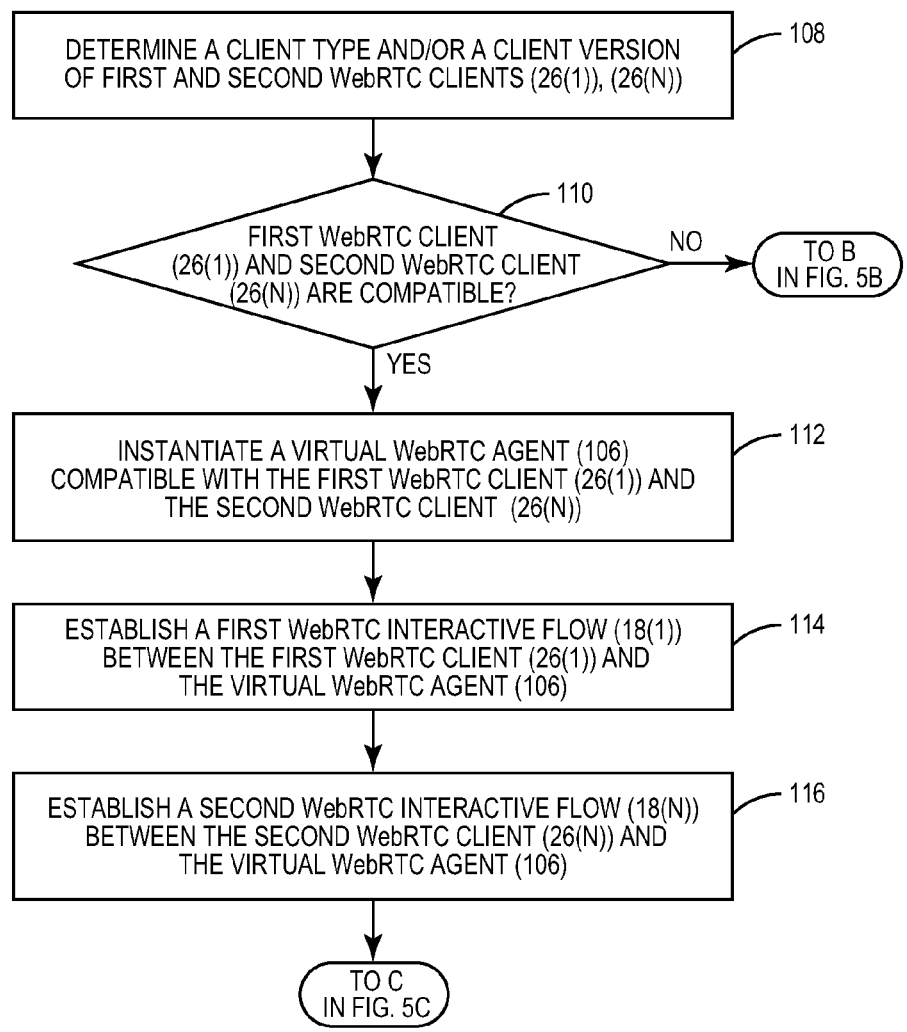
FIGS. 5A-5C are flowcharts illustrating more detailed exemplary operations for providing a scalable WebRTC media engine and virtual WebRTC agents.
Figure 5B:
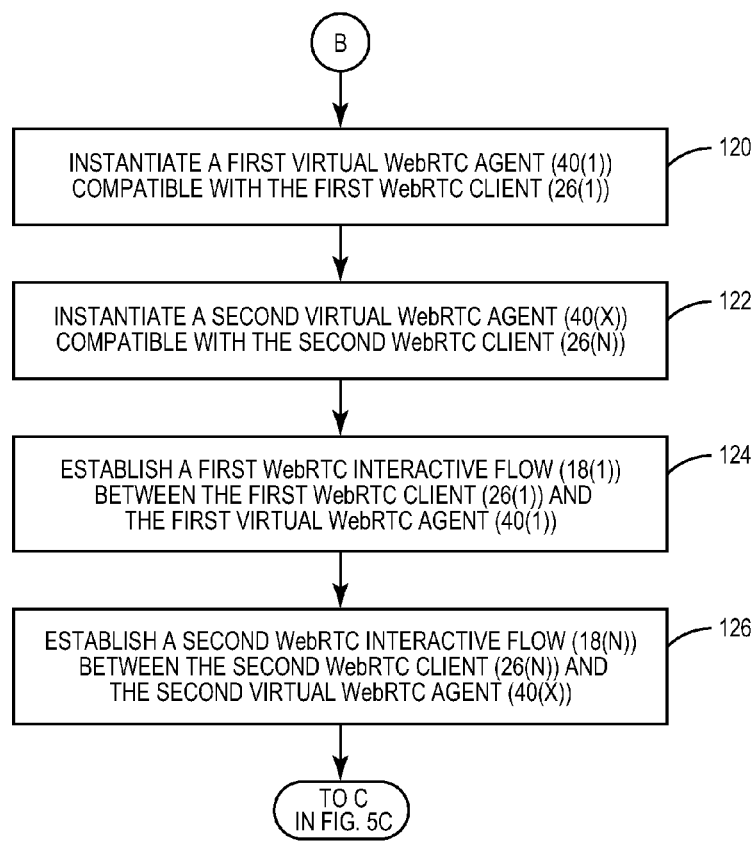
Figure 5C:
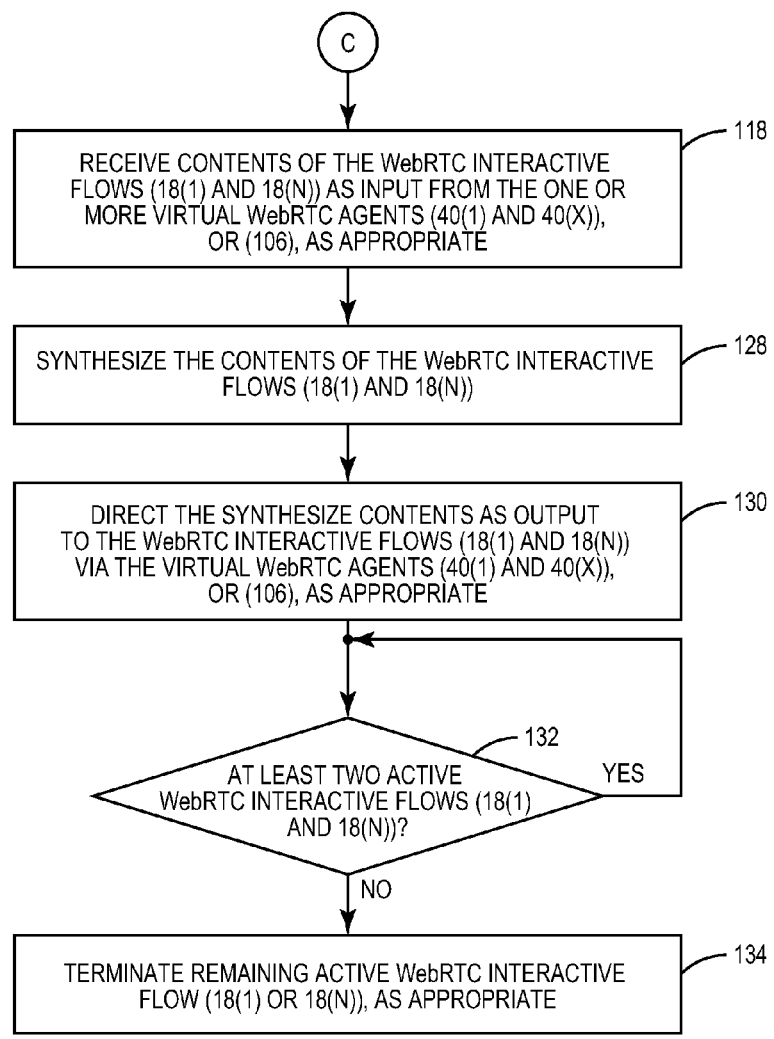

FIGS. 5A-5C are provided to illustrate in greater detail an exemplary generalized process for the WebRTC application provider 36 and the scalable WebRTC media engine 14 of FIG. 1 to provide synthesizing of WebRTC content through the use of the virtual WebRTC agents 40, 106. For illustrative purposes, FIGS. 5A-5C refer to elements of the exemplary interactive communications system 10 of FIGS. 1 and 4. FIG. 5A details operations for determining the compatibility of the WebRTC clients 26(1) and 26(N) seeking to establish a WebRTC interactive session, and providing a single virtual WebRTC agent 106 if the WebRTC clients 26(1) and 26(N) are compatible. FIG. 5B shows operations for providing multiple virtual WebRTC agents 40(1) and 40(X) in a situation in which the WebRTC clients 26(1) and 26(N) are not compatible, or if for some other reason multiple virtual WebRTC agents 40 are desirable. FIG. 5C illustrates operations for synthesizing the content of the WebRTC interactive flows 18(1) and 18(N).

In FIG. 5A, processing begins with the scalable WebRTC media engine 14 determining a client type and/or a client version of a first WebRTC client 26(1) and a second WebRTC client 26(N) (block 108). Some embodiments may provide that this determination may be made based on a WebRTC offer/answer exchange, on an HTTP header, or on other data provided by the WebRTC clients 26(1) and/or 26(N). Based on the client type and/or the client version, the scalable WebRTC media engine 14 determines whether the first WebRTC client 26(1) and the second WebRTC client 26(N) are known to be compatible (block 110).

If the first WebRTC client 26(1) and the second WebRTC client 26(N) are determined to be compatible, the scalable WebRTC media engine 14 may enable a WebRTC interactive session between the first WebRTC client 26(1) and the second WebRTC client 26(N) using a single virtual WebRTC agent 106, as discussed above with respect to FIG. 4. Accordingly, the scalable WebRTC media engine 14 instantiates a virtual WebRTC agent 106 that is compatible with both the first WebRTC client 26(1) and the second WebRTC client 26(N) (block 112). As a non-limiting example, the scalable WebRTC media engine 14 may execute a WebRTC client of the same client type and/or version as the first WebRTC client 26(1) and/or the second WebRTC client 26(N). The scalable WebRTC media engine 14 then establishes a first WebRTC interactive flow 18(1) between the first WebRTC client 26(1) and the virtual WebRTC agent 106 (block 114). The scalable WebRTC media engine 14 also establishes a second WebRTC interactive flow 18(N) between the second WebRTC client 26(N) and the virtual WebRTC agent 106 (block 116). Processing then resumes at block 118 of FIG. 5C.

Returning to decision block 110 of FIG. 5A, if the scalable WebRTC media engine 14 determines that the first WebRTC client 26(1) and the second WebRTC client 26(N) are not fully compatible, the scalable WebRTC media engine 14 may enable a WebRTC interactive session between the first WebRTC client 26(1) and the second WebRTC client 26(N) using two virtual WebRTC agents 40(1) and 40(X), as discussed above with respect to FIG. 1. Accordingly, processing resumes at block 120 of FIG. 5B. The scalable WebRTC media engine 14 instantiates the first virtual WebRTC agent 40(1) that is compatible with the first WebRTC client 26(1) (block 120). The scalable WebRTC media engine 14 also instantiates the second virtual WebRTC agent 40(X) that is compatible with the second WebRTC client 26(N) (block 122). In some embodiments, the virtual WebRTC agents 40(1) and 40(X) have a same client type and/or client version as the WebRTC clients 26(1) and 26(N), respectively.

The scalable WebRTC media engine 14 then establishes a first WebRTC interactive flow 18(1) between the first WebRTC client 26(1) and the first virtual WebRTC agent 40(1) (block 124). The scalable WebRTC media engine 14 also establishes a second WebRTC interactive flow 18(N) between the second WebRTC client 26(N) and the second virtual WebRTC agent 40(X) (block 126). Because each of the first WebRTC client 26(1) and the second WebRTC client 26(N) are interacting directly with their respective compatible virtual WebRTC agents 40(1) and 40(X), no compatibility issues should arise with respect to the WebRTC interactive flows 18(1) and 18(N). Processing then resumes at block 118 of FIG. 5C.

Referring now to FIG. 5C, the scalable WebRTC media engine 14 receives contents of the WebRTC interactive flows 18(1) and 18(N) as input from the virtual WebRTC agents 40(1) and 40(X), or from the virtual WebRTC agent 106, as appropriate (block 118). In some embodiments, this may be accomplished through the use of virtual audio receivers 44, virtual video receivers 46, and virtual data receivers 48 provided by the scalable WebRTC media engine 14, as illustrated in FIG. 1. The scalable WebRTC media engine 14 then synthesizes the contents of the WebRTC interactive flows 18(1) and 18(N) (block 128). Synthesizing the content of the WebRTC interactive flows 18(1) and 18(N) may include selectively combining audio, video, and/or data content of the WebRTC interactive flows 18(1) and 18(N) to generate synthesized content.

The scalable WebRTC media engine 14 then directs the synthesized contents as output to the WebRTC interactive flows 18(1) and 18(N) via the virtual WebRTC agents 40(1) and 40(X), or the virtual WebRTC agent 106, as appropriate (block 130). Some embodiments may provide that the scalable WebRTC media engine 14 directs the synthesized content using virtual audio transmitters 50, virtual video transmitters 52, and/or virtual data transmitters 54 to which the corresponding virtual WebRTC agents 40(1)-40(X) are communicatively coupled. The scalable WebRTC media engine 14 next determines whether there are at least two active WebRTC interactive flows 18 among the WebRTC interactive flows 18(1) and 18(N) (block 132). If the WebRTC interactive flows 18(1) and 18(N) are still active, processing returns to block 132 of FIG. 5C. Otherwise, the scalable WebRTC media engine 14 terminates the remaining active WebRTC interactive flow 18(1) or 18(N), as appropriate (block 134).

Figure 6:
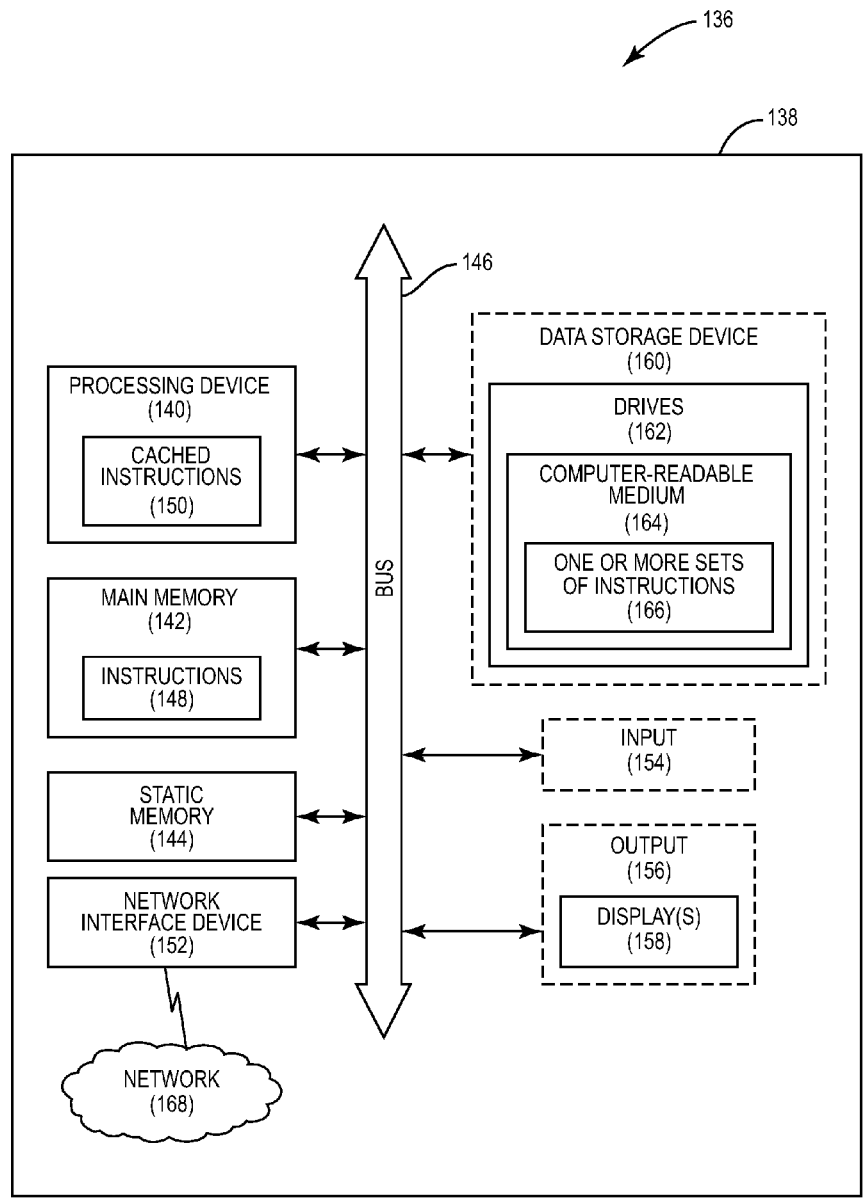
FIG. 6 is a block diagram of an exemplary processor-based system that may include the WebRTC server and the WebRTC media engine of FIG. 1.

FIG. 6 provides a schematic diagram representation of a processing system 136 in the exemplary form of an exemplary computer system 138 adapted to execute instructions to perform the functions described herein. In some embodiments, the processing system 136 may execute instructions to perform the functions of the scalable WebRTC media engine 14 of FIG. 1. In this regard, the processing system 136 may comprise the computer system 138, within which a set of instructions for causing the processing system 136 to perform any one or more of the methodologies discussed herein may be executed. The processing system 136 may be connected (as a non-limiting example, networked) to other machines in a local area network (LAN), an intranet, an extranet, or the Internet. The processing system 136 may operate in a client-server network environment, or as a peer machine in a peer-to-peer (or distributed) network environment. While only a single processing system 136 is illustrated, the terms "controller" and "server" shall also be taken to include any collection of machines that individually or jointly execute a set (or multiple sets) of instructions to perform any one or more of the methodologies discussed herein. The processing system 136 may be a server, a personal computer, a desktop computer, a laptop computer, a personal digital assistant (PDA), a computing pad, a mobile device, or any other device and may represent, as non-limiting examples, a server or a user's computer.

The exemplary computer system 138 includes a processing device or processor 140, a main memory 142 (as non-limiting examples, read-only memory (ROM), flash memory, dynamic random access memory (DRAM) such as synchronous DRAM (SDRAM), etc.), and a static memory 144 (as non-limiting examples, flash memory, static random access memory (SRAM), etc.), which may communicate with each other via a bus 146. Alternatively, the processing device 140 may be connected to the main memory 142 and/or the static memory 144 directly or via some other connectivity means.

The processing device 140 represents one or more processing devices, such as a microprocessor, central processing unit (CPU), or the like. More particularly, the processing device 140 may be a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The processing device 140 is configured to execute processing logic in instructions 148 and/or cached instructions 150 for performing the operations and steps discussed herein.

The computer system 138 may further include a communications interface in the form of a network interface device 152. It also may or may not include an input 154 to receive input and selections to be communicated to the computer system 138 when executing the instructions 148, 150. It also may or may not include an output 156, including but not limited to display(s) 158. The display(s) 158 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 138 may or may not include a data storage device 160 that includes using drive(s) 162 to store the functions described herein in a computer-readable medium 164, on which is stored one or more sets of instructions 166 (e.g., software) embodying any one or more of the methodologies or functions described herein. The functions can include the methods and/or other functions of the processing system 136, a participant user device, and/or a licensing server, as non-limiting examples. The one or more sets of instructions 166 may also reside, completely or at least partially, within the main memory 142 and/or within the processing device 140 during execution thereof by the computer system 138. The main memory 142 and the processing device 140 also constitute machine-accessible storage media. The instructions 148, 150, and/or 166 may further be transmitted or received over a network 168 via the network interface device 152. The network 168 may be an intra-network or an inter-network.

While the computer-readable medium 164 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 166. The term "machine-accessible storage medium" shall also be taken to include any medium that is capable of storing, encoding, or carrying a set of instructions 148, 150, and/or 166 for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:
1. A method for providing a scalable Web Real-Time Communications (WebRTC) media engine, comprising:
    instantiating, by a WebRTC media engine executing on a computing device, one or more virtual WebRTC agents, each corresponding to one or more of a plurality of WebRTC clients;

establishing a plurality of WebRTC interactive flows, each connecting one of the one or more virtual WebRTC agents with the corresponding one or more of the plurality of WebRTC clients;

receiving contents of the plurality of WebRTC interactive flows as input from the one or more virtual WebRTC agents;

synthesizing the contents of the plurality of WebRTC interactive flows; and directing the synthesized contents as output to one or more of the plurality of WebRTC interactive flows via the one or more virtual WebRTC agents.

2. The method of claim 1, wherein synthesizing the contents of the plurality of WebRTC interactive flows comprises applying an N loudest algorithm, a loudest and longest algorithm, or an N−1 algorithm, or combinations thereof, to an audio content of one or more of the plurality of WebRTC interactive flows.

3. The method of claim 1, wherein synthesizing the contents of the plurality of WebRTC interactive flows comprises selecting a video content of one or more of the plurality of WebRTC interactive flows, combining video contents of two or more of the plurality of WebRTC interactive flows, modifying a video content of one or more of the plurality of WebRTC interactive flows, or combinations thereof.

4. The method of claim 1, further comprising determining a client type or a client version, or a combination thereof, of the one or more of the plurality of WebRTC clients.

5. The method of claim 4, wherein determining the client type or the client version, or the combination thereof, of the one or more of the plurality of WebRTC clients is based on a WebRTC offer/answer exchange, a query/response exchange between the WebRTC media engine and the one or more of the plurality of WebRTC clients, or a Hyper Text Transfer Protocol (HTTP) header, or a combination thereof.

6. The method of claim 4, wherein instantiating the one or more virtual WebRTC agents comprises:
   determining, based on the client type or the client version, or the combination thereof, that a first WebRTC client of the plurality of WebRTC clients is compatible with a second WebRTC client of the plurality of WebRTC clients; and
   instantiating a virtual WebRTC agent compatible with the first WebRTC client and the second WebRTC client.

7. The method of claim 4, wherein instantiating the one or more virtual WebRTC agents comprises:
   determining, based on the client type or the client version, or the combination thereof, that a first WebRTC client of the plurality of WebRTC clients is not compatible with a second WebRTC client of the plurality of WebRTC clients;
   instantiating a first virtual WebRTC agent compatible with the first WebRTC client; and
   instantiating a second virtual WebRTC agent compatible with the second WebRTC client.

8. A system for providing a scalable Web Real-Time Communications (WebRTC) media engine, comprising:
   at least one communications interface; and
   a WebRTC server associated with the at least one communications interface and comprising a WebRTC media engine configured to:
      instantiate one or more virtual WebRTC agents, each corresponding to one or more of a plurality of WebRTC clients;
      establish a plurality of WebRTC interactive flows, each connecting one of the one or more virtual WebRTC agents with the corresponding one or more of the plurality of WebRTC clients;
      receive contents of the plurality of WebRTC interactive flows as input from the one or more virtual WebRTC agents;
      synthesize the contents of the plurality of WebRTC interactive flows; and
      direct the synthesized contents as output to one or more of the plurality of WebRTC interactive flows via the one or more virtual WebRTC agents.

9. The system of claim 8, wherein the WebRTC media engine is configured to synthesize the contents of the plurality of WebRTC interactive flows by applying an N loudest algorithm, a loudest and longest algorithm, or an N−1 algorithm, or combinations thereof, to an audio content of one or more of the plurality of WebRTC interactive flows.

10. The system of claim 8, wherein the WebRTC media engine is further configured to determine a client type or a client version, or a combination thereof, of the one or more of the plurality of WebRTC clients.

11. The system of claim 10, wherein the WebRTC media engine is configured to determine the client type or the client version, or the combination thereof, of the one or more of the plurality of WebRTC clients based on a WebRTC offer/answer exchange, a query/response exchange between the WebRTC media engine and the one or more of the plurality of WebRTC clients, or a Hyper Text Transfer Protocol (HTTP) header.

12. The system of claim 10, wherein the WebRTC media engine is configured to instantiate the one or more virtual WebRTC agents by:
   determining, based on the client type or the client version, or the combination thereof, that a first WebRTC client of the plurality of WebRTC clients is compatible with a second WebRTC client of the plurality of WebRTC clients; and
   instantiating a virtual WebRTC agent compatible with the first WebRTC client and the second WebRTC client.

13. The system of claim 10, wherein the WebRTC media engine is configured to instantiate the one or more virtual WebRTC agents by:
   determining, based on the client type or the client version, or the combination thereof, that a first WebRTC client of the plurality of WebRTC clients is not compatible with a second WebRTC client of the plurality of WebRTC clients;
   instantiating a first virtual WebRTC agent compatible with the first WebRTC client; and
   instantiating a second virtual WebRTC agent compatible with the second WebRTC client.

14. A non-transitory computer-readable medium having stored thereon computer-executable instructions to cause a processor to implement a method, comprising:
   instantiating one or more virtual Web Real-Time Communications (WebRTC) agents, each corresponding to one or more of a plurality of WebRTC clients;
   establishing a plurality of WebRTC interactive flows, each connecting one of the one or more virtual WebRTC agents with the corresponding one or more of the plurality of WebRTC clients;
   receiving contents of the plurality of WebRTC interactive flows as input from the one or more virtual WebRTC agents;
   synthesizing the contents of the plurality of WebRTC interactive flows; and directing the synthesized contents as output to one or more of the plurality of WebRTC interactive flows via the one or more virtual WebRTC agents.

15. The non-transitory computer-readable medium of claim 14 having stored thereon the computer-executable instructions to cause the processor to implement the method, wherein synthesizing the contents of the plurality of WebRTC interactive flows comprises applying an N loudest algorithm, a loudest and longest algorithm, or an N−1 algorithm, or combinations thereof, to an audio content of one or more of the plurality of WebRTC interactive flows.

16. The non-transitory computer-readable medium of claim 14 having stored thereon the computer-executable instructions to cause the processor to implement the method, further comprising determining a client type or a client version, or a combination thereof, of the one or more of the plurality of WebRTC clients.

17. The non-transitory computer-readable medium of claim 16 having stored thereon the computer-executable instructions to cause the processor to implement the method, wherein determining the client type or the client version, or the combination thereof, of the one or more of the plurality of WebRTC clients is based on a WebRTC offer/answer exchange, a query/response exchange between the WebRTC media engine and the one or more of the plurality of WebRTC clients, or a Hyper Text Transfer Protocol (HTTP) header, or a combination thereof.

18. The non-transitory computer-readable medium of claim 16 having stored thereon the computer-executable instructions to cause the processor to implement the method, wherein instantiating the one or more virtual WebRTC agents comprises:
   determining, based on the client type or the client version, or the combination thereof, that a first WebRTC client of the plurality of WebRTC clients is compatible with a second WebRTC client of the plurality of WebRTC clients; and
   instantiating a virtual WebRTC agent compatible with the first WebRTC client and the second WebRTC client.

19. The non-transitory computer-readable medium of claim 16 having stored thereon the computer-executable instructions to cause the processor to implement the method, wherein instantiating the one or more virtual WebRTC agents comprises:
   determining, based on the client type or the client version, or the combination thereof, that a first WebRTC client of the plurality of WebRTC clients is not compatible with a second WebRTC client of the plurality of WebRTC clients;
   instantiating a first virtual WebRTC agent compatible with the first WebRTC client; and
   instantiating a second virtual WebRTC agent compatible with the second WebRTC client.

20. The non-transitory computer-readable medium of claim 14 having stored thereon the computer-executable instructions to cause the processor to implement the method, wherein the one or more virtual WebRTC agents comprises web browser applications executing within a virtualization environment.

* * * * *